(12) United States Patent
Sekiguchi et al.

(10) Patent No.: US 8,230,101 B2
(45) Date of Patent: Jul. 24, 2012

(54) SERVER DEVICE FOR MEDIA, METHOD FOR CONTROLLING SERVER FOR MEDIA, AND PROGRAM

(75) Inventors: Satoru Sekiguchi, Hachiouji (JP); Yoshio Sonoda, Sagamihara (JP); Isao Nakamura, Yokohama (JP); Masamichi Furukawa, Hachiouji (JP); Yoshihisa Mashita, Kodaira (JP); Tomoaki Yoshida, Hino (JP); Masahito Watanabe, Sagamihara (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 205 days.

(21) Appl. No.: 12/527,777

(22) PCT Filed: Mar. 2, 2007

(86) PCT No.: PCT/JP2007/054603
§ 371 (c)(1),
(2), (4) Date: Sep. 2, 2009

(87) PCT Pub. No.: WO2008/108002
PCT Pub. Date: Sep. 12, 2008

(65) Prior Publication Data
US 2010/0121911 A1    May 13, 2010

(51) Int. Cl.
*G06F 15/16* (2006.01)
*H04N 7/173* (2006.01)
(52) U.S. Cl. .......................................... 709/231; 725/86
(58) Field of Classification Search .......... 709/201–203, 709/231; 725/37–61, 86–104, 143–153
See application file for complete search history.

(56) References Cited

U.S. PATENT DOCUMENTS 7,219,123 B1 *   5/2007   Fiechter et al. ............... 709/203
2002/0116082 A1   8/2002   Gudorf
(Continued)

FOREIGN PATENT DOCUMENTS

EP           1 311 122          5/2003
(Continued)

OTHER PUBLICATIONS

Ritchie, J. et al. "UPnP AV Architecture:1", Internet Citation, Jun. 25, 2002, pp. 1-22, XP002592211, Retrieved from the Internet: URL:http://www.upnp.org/specs/av/UPnP-av-AVArchitecture-v1-20020625.pdf [retrieved on Jul. 15, 2010].

(Continued)

*Primary Examiner* — Shirley Zhang
(74) *Attorney, Agent, or Firm* — Eric J. Robinson; Robinson Intellectual Property Law Office, P.C.

(57) ABSTRACT

Transfer control means (41) transfers part of held digital contents in an internal storage device (51) to a network storage device (57). List information presentation means (42) returns list information which makes the digital contents stored in the internal storage device (51) and the network storage device (57) as the held digital contents in response to a list presentation request for the held digital contents. Upon reception of a data transmission request, search means (43) searches where the held digital contents are currently stored. If the result of the search shows the network storage device (57), content data transmission processing means (44) allows the stream-delivery of the data from the network storage device (57) to a network player (56). There is provided a server device for media (40) capable of maintaining the convenience of playback in a network player, while properly dealing with the large total size of held digital contents.

12 Claims, 6 Drawing Sheets

U.S. PATENT DOCUMENTS

| | | |
|---|---|---|
| 2003/0079016 A1 | 4/2003 | Tsao |
| 2003/0225568 A1 | 12/2003 | Salmonsen |
| 2006/0020589 A1* | 1/2006 | Wu et al. .................... 707/3 |
| 2006/0161635 A1 | 7/2006 | Lamkin et al. |
| 2006/0184972 A1* | 8/2006 | Rafey et al. .................. 725/80 |
| 2006/0259945 A1 | 11/2006 | Kimura et al. |
| 2006/0281477 A1* | 12/2006 | Downes ...................... 455/509 |
| 2007/0002784 A1* | 1/2007 | Edwards ..................... 370/315 |
| 2007/0238471 A1* | 10/2007 | Bae et al. .................... 455/455 |
| 2007/0288966 A1* | 12/2007 | Javid et al. .................. 725/46 |
| 2008/0104219 A1* | 5/2008 | Kageyama et al. ........... 709/223 |
| 2009/0157892 A1* | 6/2009 | Sekiguchi et al. ............ 709/231 |
| 2009/0252176 A1* | 10/2009 | Morita et al. ................ 370/401 |
| 2010/0198915 A1* | 8/2010 | Mashita et al. ............... 709/203 |

FOREIGN PATENT DOCUMENTS

| | | |
|---|---|---|
| EP | 1 596 559 | 11/2005 |
| JP | 10-021174 | 1/1998 |
| JP | 2000-163224 | 6/2000 |
| JP | 2001-092749 | 4/2001 |
| JP | 2002-083485 | 3/2002 |
| JP | 2003-228533 | 8/2003 |
| JP | 2005-167768 | 6/2005 |
| JP | 2005-328443 | 11/2005 |
| JP | 2006-185473 | 7/2006 |
| JP | 2006-304093 | 11/2006 |
| JP | 2006-311313 | 11/2006 |

OTHER PUBLICATIONS

Supplementary European Search Report (Application No. 07738088.9) dated Mar. 23, 2011.
International Search Report for PCT/JP2007/054603.
International Preliminary Examination Report (Application No. PCT/JP2007/054603) dated Sep. 17, 2009.
Japanese Office Action (Application No. 2005-254213) dated Oct. 4, 2010.

* cited by examiner

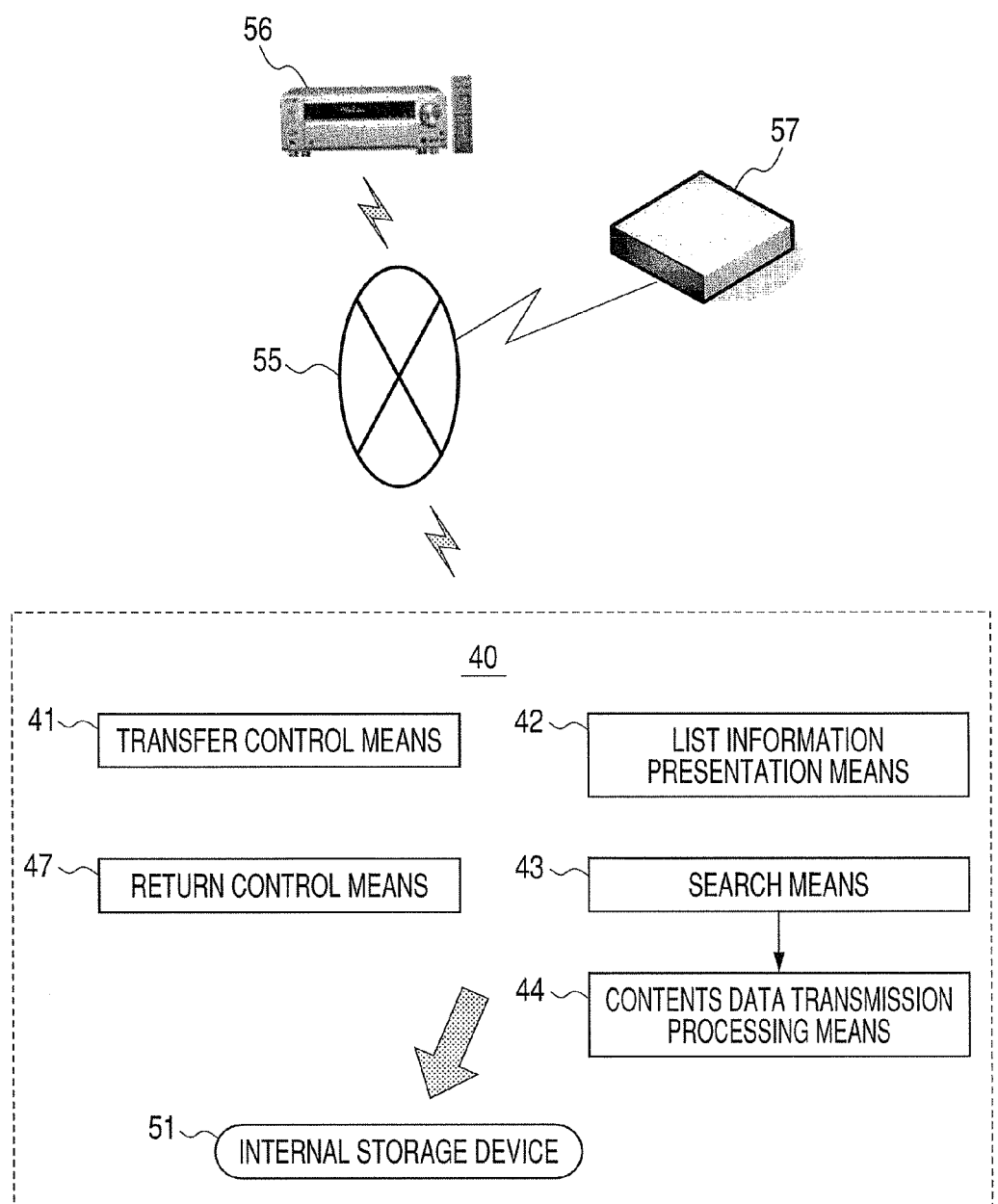

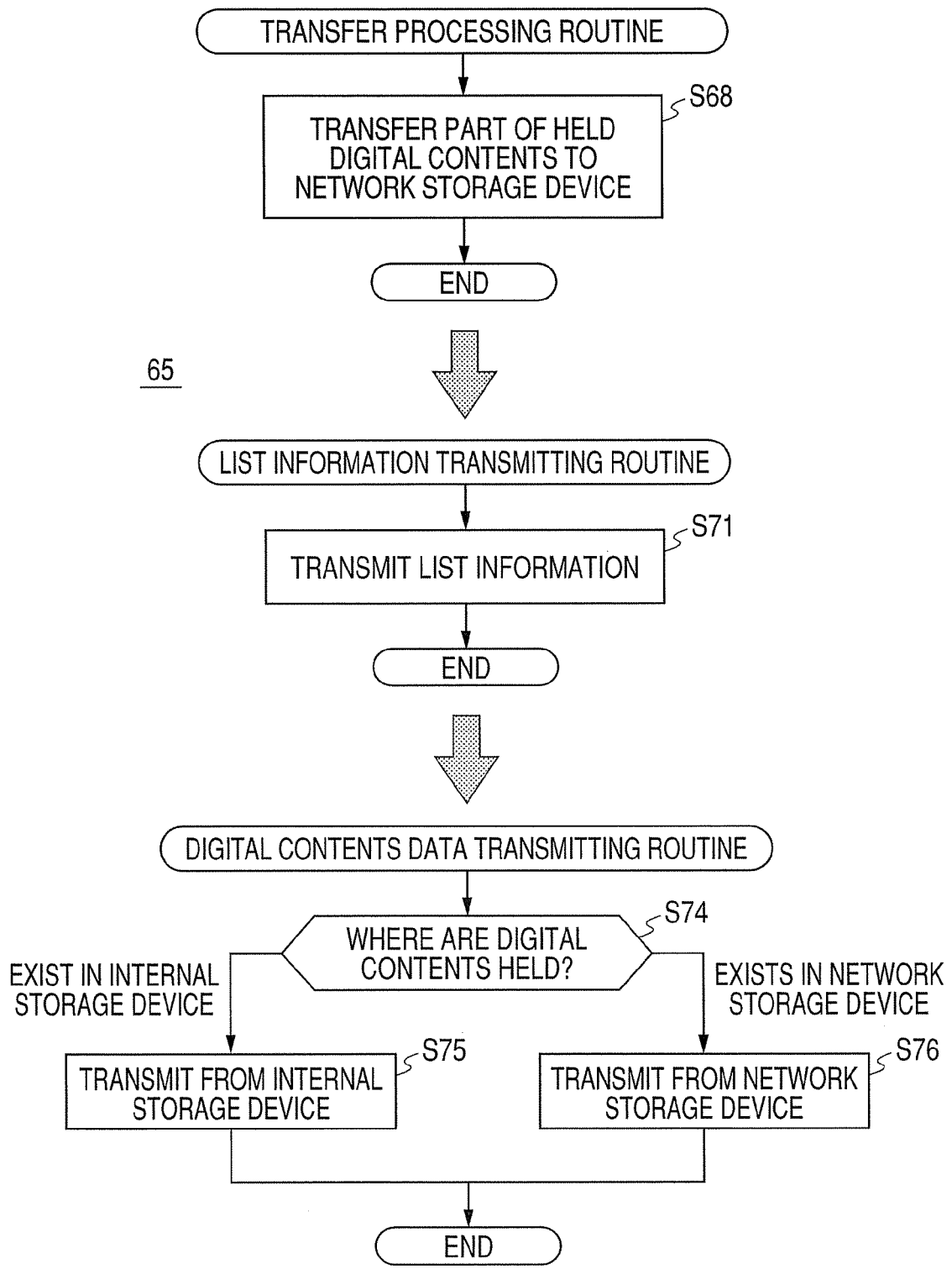

SERVER DEVICE FOR MEDIA, METHOD FOR CONTROLLING SERVER FOR MEDIA, AND PROGRAM

TECHNICAL FIELD

The present invention relates to a server device for media such as an HDD portable player, a method for controlling a server for media, and a program for the same, and more particularly to a server device for media capable of smoothly dealing with the large amount of digital contents, a method for controlling a server for media, and a program for the same.

BACKGROUND ART

In DLNA (Digital Living Network Alliance), a guideline for guaranteeing the mutual compatibility among electric appliances, PCs, and mobile equipment is prescribed. When equipment units conforming to the guideline are connected to a home network, they are mutually connected to share digital contents such as music, photographs, moving pictures, and the like. It is predicted that the equipment units conforming to the DLNA are used not only over a home network but also over an onboard network in the future. The network that has an equipment unit conforming to the DLNA connected thereto will be referred to as "a DLNA network" below.

On the other hand, the HDD portable player is carried by a user with a great number of music pieces held on the HDD (hard disk device) so that the music pieces can be played. As a usage aspect of the HDD portable player, a user connects his or her HDD portable player to his or her home or automobile DLNA network through a wireless LAN or a cable LAN and plays a music piece held in the HDD portable player with a network player to listen to the music alone or as a group of his or her family members or friends.

Japanese Patent Application Laid-Open No. 2004-208204 (Patent Document) discloses a hard disk recorder for recording television programs that automatically deletes contents corresponding to a predetermined condition from contents stored therein when the hard disk, although with a large capacity, has stored many amounts of contents data so that an insufficient capacity is left for storing a new television program.

DISCLOSURE OF THE INVENTION

It is convenient to use an HDD portable player as a server device for media to play, as required, music pieces held therein from any of the network players which are connected to the same network as that the HDD portable player is connected to. Although the capacity of the HDD in the HDD portable player is large, it is limited, however. Thus, the HDD can store limited amounts of music pieces.

A user may want to listen to different music pieces at each time when the user is out with the HDD portable player. If a large number of music pieces are held in the HDD, the user may wants to change a part of the music pieces held in the HDD at each time when the user goes out.

The HDD portable player may be adapted to have its HDD store pictures as well as music pieces or the HDD portable player may be adapted to be shared by a couple or siblings. In such cases, the total size of the digital contents the user wants to store in the HDD of the HDD portable player increases by much.

When the hard disk recorder disclosed in the Patent Document has an insufficient capacity free, it can do nothing but delete a part of the stored contents data in order to store further new contents. Even if the hard disk recorder is adapted to transfer a part of the stored contents data to a storage medium such as a DVD-R or the like instead of deleting them, the hard disk recorder is difficult to play the transferred contents as required.

An object of the present invention is to provide a server device for media, a method for controlling a server for media, and a program for the same which is capable of maintaining the convenience of playback in a network player, while properly dealing with the large total size of held digital contents.

MEANS FOR SOLVING THE PROBLEMS

The server device for media according to the present invention is equipped with an internal storage device for storing digital contents, and responds to a data transmission request from a network player by stream-delivering corresponding data in corresponding digital contents from the internal storage device to the network player during connection to the network. The server device for media according to the present invention has means shown below:

transfer control means for transferring and storing part of held digital contents in the internal storage device to a network storage device, wherein the network storage device is connected to the network and is capable of storing data;

list information transmission means for responding to a list presentation request for the held digital contents of the server device for media from the network player by transmitting list information to the network player, wherein the list information makes the digital contents left in the internal storage device and the digital contents transferred from the internal storage device to the network storage device and stored in the network storage device as the held digital contents of the internal storage device;

search means for responding to a data transmission request for the held digital contents from the network player by searching for a location where the held digital contents are currently stored; and digital contents data transmission processing means for allowing the corresponding data to be stream-delivered from the network storage device to the network player, if the result of search shows the network storage device.

The server device for media to which the method for controlling a server according to the present invention is applied is equipped with an internal storage device for storing digital contents, and responds to a data transmission request from a network player by stream-delivering corresponding data in corresponding digital contents from the internal storage device to the network player during connection to the network. The method for controlling a server according to the present invention has steps shown below:

a step of transferring part of held digital contents in the internal storage device to a network storage device, wherein the network storage device is connected to the network and is capable of storing data;

a step of responding to a list presentation request for the held digital contents of the server device for media from the network player by transmitting list information to the network player, wherein the list information makes the digital contents stored in the internal storage device and the network storage device as the held digital contents;

a step of responding to a data transmission request for the held digital contents from the network player by searching for a location where the held digital contents are currently stored; and a step of allowing the corresponding data to be stream-delivered from the network storage device to the network player, if the result of search shows the network storage device.

The program according to the present invention causes a computer to function as each means of the above-described server device for media. The program according to the present invention also causes a computer to execute each step of the above-described control method.

EFFECTS OF THE INVENTION

According to the present invention, a list transmission request and a data transmission request for the held digital contents of the server device for media to be played by the network player can be made as if all the digital contents were left in the internal storage device of the server device for media, while part of the held digital contents has been transferred from the internal storage device to the network storage device. As a result, the present invention can make the network player to implement playback of the held digital contents of the server device for media without fail, while increasing the total amount of the held digital contents.

BRIEF DESCRIPTION OF THE DRAWINGS

FIG. 5 is a block diagram showing a server device for media; and

FIG. 6 is a flowchart of a method for controlling a server for media.

BEST MODES FOR CARRYING OUT THE INVENTION

Figure 1:
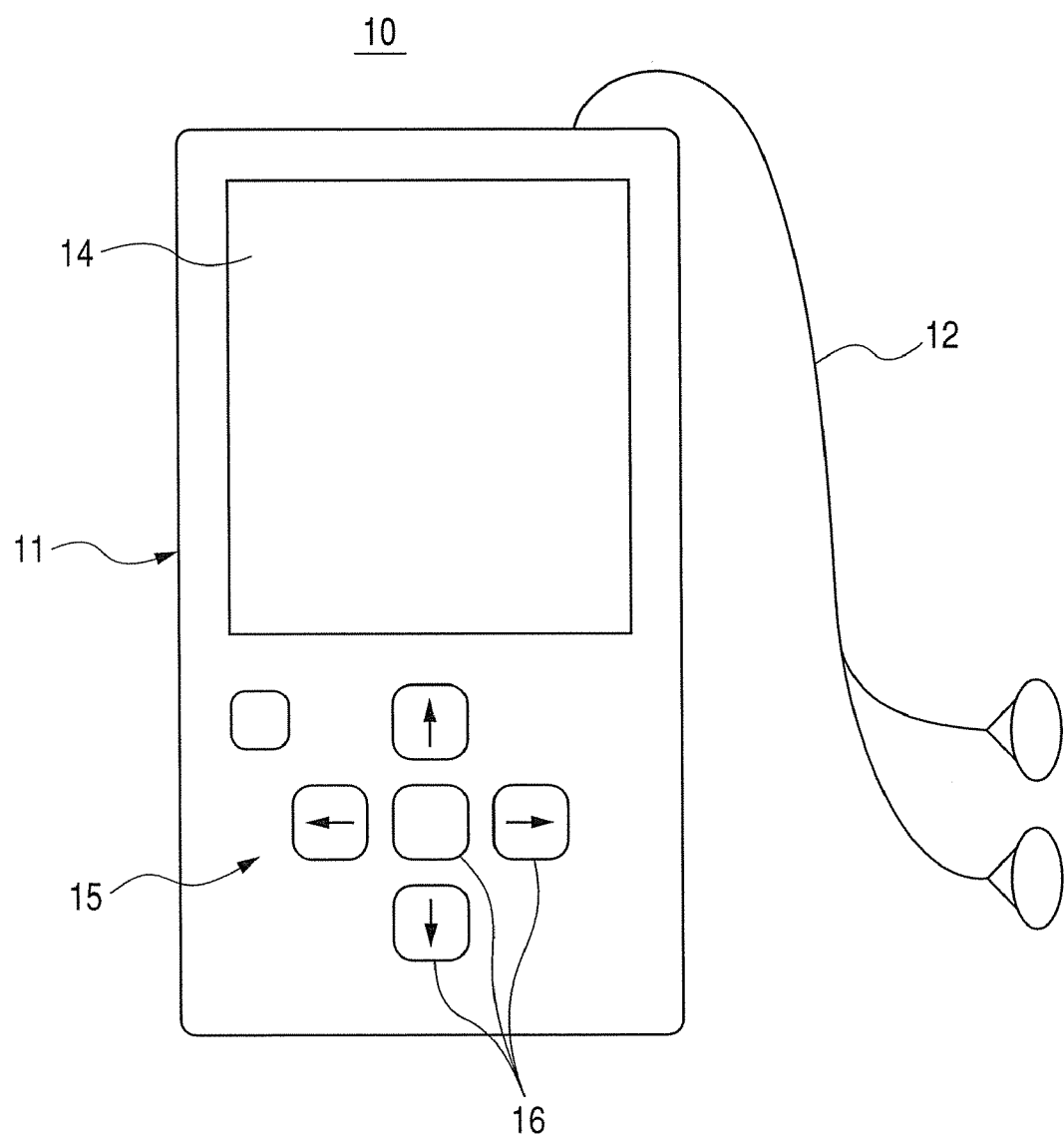
FIG. 1 is a front view of an HDD portable player.

FIG. 1 is a front view of an HDD portable player 10. The HDD portable player 10 includes a body 11 and headphones 12 capable of freely inserting and removing its jack into and from the body 11 and has dimensions and weight which are convenient for a user 19 (FIG. 2) to carry in his or her pocket or the like. The HDD portable player 10 is driven by the power of the built-in battery, which is chargeable as required. On the front surface of the body 11, a color LCD 14 and an operation key array unit 15 are arranged at the upper and lower portions of the body 11, respectively. The operation key array unit 15 includes a plurality of operation keys 16. The HDD (not shown) of the HDD portable player 10 records a number of music pieces in a predetermined format so that the music pieces can be played as required. The HDD portable player 10 is equipped with a built-in radio for a wireless LAN.

The user 19 holds the body 11 in one hand, and operates the operation keys 16 by the other hand, thereby issuing various indications to the HDD portable player 10 to start selecting and playing a desired music piece. The user 19 inserts the right and left speaker units of the headphones 12 into the right and left ears respectively to listen to the played sound of the music pieces.

Figure 2:
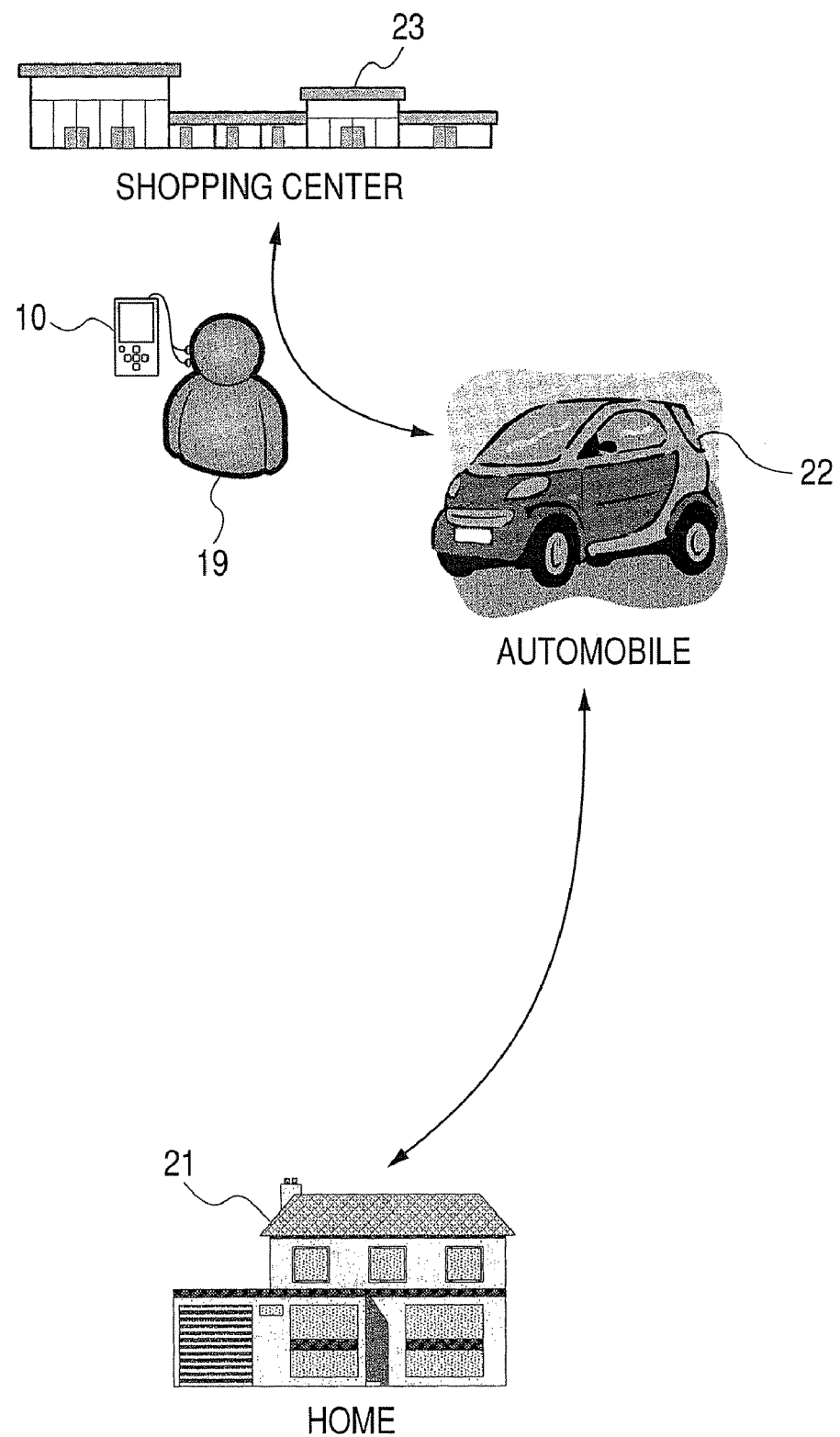
FIG. 2 is an explanatory view showing an example of the movement of the HDD portable player.

FIG. 2 is an explanatory view showing an example of the movement of the HDD portable player 10. A DLNA network is built in home 21 and an automobile 22. The user 19 drives, for example, the automobile 22 from the home 21 to a shopping center 23, parks the automobile 22 at a parking lot of the shopping center 23, and does shopping in the shopping center 23. The user 19 carries the HDD portable player 10 into the automobile 22. In the home 21 or the automobile 22, the user 19 can listen to a music piece through a speaker for the network player by issuing an indication to play a music piece held in the HDD portable player 10 from the network player using the network in the home 21 or the automobile 22. The user 19 can also use the HDD portable player 10 by itself in the home 21, the automobile 22, and the shopping center 23 to listen to the music pieces held in the HDD portable player 10 through the headphones 12 as required.

Figure 3:
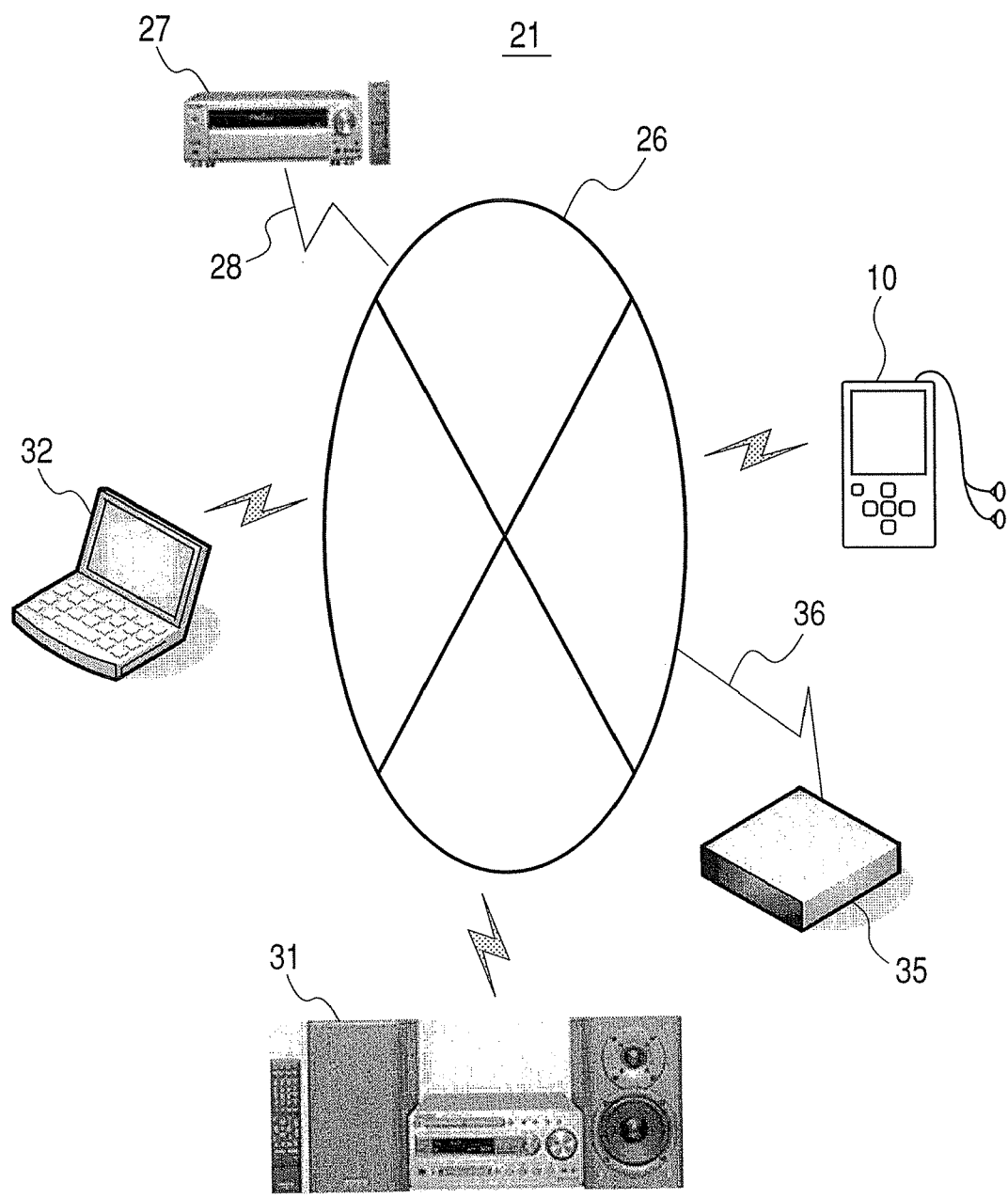
FIG. 3 is a diagram showing a situation of a network to which the HDD portable player is connected.

FIG. 3 is a diagram showing a situation of a network 26 to which the HDD portable player 10 is connected. The network 26 is a DLNA network and built in the home 21, for example. A network player 27 is connected to the network 26 through a LAN cable 28. The HDD portable player 10, a network player 31, and a personal computer 32 are wirelessly connected to the network 26. The network HDD 35 is connected to the network 26 through a LAN cable 36 and is capable of reading and writing data by remote control from the HDD portable player 10. The personal computer 32 can be used as a server and a client. The HDD portable player 10 functions as a server for delivering music pieces, pictures and other contents. The network HDD 35 can also function as an HTTP server.

In the terminology of the DLNA network, the HDD portable player 10 which delivers music pieces is called "DMS (Digital Media Server)", and the networks 26 and 31 which receive delivery of music pieces are called "DMP (Digital Media Player)".

For the convenience of description, listening to the held music pieces of the HDD portable player 10 through the headphones 12 is referred to as "self-playback", and listening to the held music pieces through the network player such as the network players 27, 31 and the like via the network such as the network 26 is referred to as "network-playback". For example, if the network player 27 is placed in the living room of the home 21, and the network player 31 is placed in the bedroom of the home 21, the user can listen to the music pieces stored in the HDD portable player 10 in the network-playback in both the network player 27 in the living room and the network player 31 in the bedroom, while keeping the HDD portable player 10 in the study or the dining room.

The user 19 alone or a group of the user 19 and family members, acquaintances, or the like may listen to the music pieces in the network-playback in the home 21 or the automobile 22. Described below is the case in which the network-playback is implemented by the network player 27. It is assumed that the network player 27 is provided in the home 21 and the automobile 22.

A user operates the network player 27 to request the HDD portable player 10 to transmit list information about the held music pieces of the HDD portable player 10. In response to the request, the HDD portable player 10 transmits the list information to the network player 27 through the network 26. The user of the network player 27 specifies a music piece desired to be played by referring to the list of music pieces displayed on a display unit of the network player 27 according to the list information received from the HDD portable player 10. Based on the user's instruction of specification, the network player 27 requests the HDD portable player 10 to transmit the data of the specified music piece. In response to the request, the HDD portable player 10 transmits the corresponding data to the network player 27 by the stream-delivery. Since the output speed of the playback sound by the network player 27 is lower in data amount conversion than the transmission speed of the data by the stream-delivery, the data relating to one music piece is transmitted by a predetermined amount at each data transmission request intermittently issued by the network player 27 in the stream-delivery.

In the CDS (content directory service) defined in the UPnP AV Protocol, the metadata in the list information format is regulated. The HDD portable player 10 can use the metadata to display a list of the contents held by the HDD portable player 10 on the network player 27.

Figure 4:
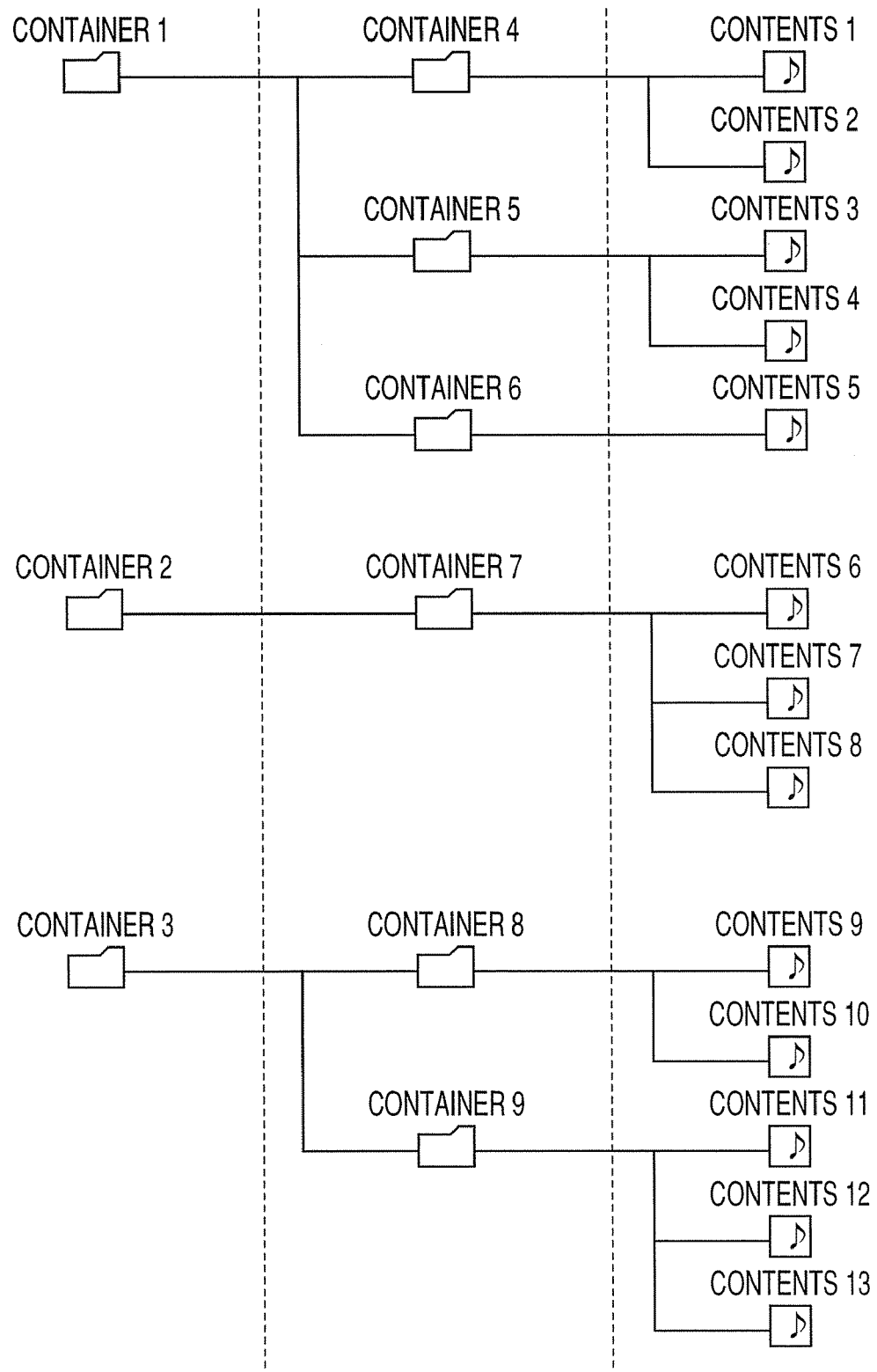
FIG. 4 is a diagram showing a structure to administer the contents in an HDD of the HDD portable player.

FIG. 4 shows a structure to administer the contents in the HDD of the HDD portable player 10. In the terminology of the UPnP/DLNA, the "contents" are referred to as items. Containers 1 to 3 are generated in the first layer below the root. Containers 4 to 9 are generated in the second layer. Contents 1 to 13 are generated in the third layer. The membership between a container and a content is shown in FIG. 4.

For example, each container in the first layer corresponds to an artist, and each container in the second layer corresponds to an album. A content is not limited to a music piece, but can be other contents to be played such as pictures including moving pictures. One content corresponds to one track of a musical CD, and corresponds to one or more chapters of a DVD for video.

In response to a list presentation request for the held music pieces of the HDD portable player 10 from the network player 27 or 31, the HDD portable player 10 returns the list information for the tree structure shown in FIG. 4 to the network player 27 or 31. The list information is written in XML, and the network player 27 or 31 that has obtained the list information displays the list on the display unit based on the analysis of the XML description.

The HDD portable player 10 allows part of the held music pieces to be transferred to the network HDD 35 and to be returned from the network HDD 35, as required, during connection with the network 26. The transferring and returning can be implemented for each container and for each content. In transferring and returning of each container, all the sub-containers and contents belonging to the container in the upper layer are included. For example, the container 2 and its descendants, the sub-container 7 and the contents 6 to 8, shown in FIG. 4 are entirely transferred to the network HDD 35. The total size of the held music pieces left in the HDD portable player 10+the total size of the music pieces transferred from the HDD of the HDD portable player 10 and stored in the network HDD 35 may exceed the capacity of the HDD of the HDD portable player 10.

To the list information presentation request and the data transmission request from the network player 27 and the like, the HDD portable player 10 responds in the same way for the held music pieces which have been transferred from its HDD to the network HDD 35 as for the held music pieces left in its HDD.

For example, if the container 2 and its descendants, the sub-container 7 and the contents 6 to shown in FIG. 4 have been entirely transferred to the network HDD 35, the list information the HDD portable player 10 presents the network player 27 and the like is the list information relating to the tree structure shown in FIG. 4, i.e., the entire tree structure that includes the tree structure of the container 2 and its descendant, the sub-container 7 and the contents 6 to 8. That is, if the contents of the HDD of the HDD portable player 10 have the tree structure shown in FIG. 4 but part of the contents has been transferred to the network HDD 35, the tree structure shown in FIG. 4 is maintained as it is to be used for the list information. Also, it is administered whether each container and each content are actually stored in the internal HDD or the network HDD 35.

If the container 2 and its descendants, the sub-container 7 and the contents 6 to 8 shown in FIG. 4 have been entirely transferred to the network HDD 35, the HDD portable player 10 responds to a request to transmit data of the contents 6, for example, issued from the network player 27 or the like by transmitting the corresponding data of the contents 6 to the requesting network player. A specific processing method will be described later.

FIG. 5 is a block diagram showing a server device for media 40. The server device for media 40 is equipped with a network storage device 57 for storing the digital contents, and, during connection to the network, responds to the data transmission request from the network player 56 by stream-delivering the corresponding data of the corresponding digital contents from the internal storage device 51 to the network player 56.

The server device for media 40 has transfer control means 41, list information presentation means 42, search means 43, and contents data transmission processing means 44. The server device for media 40 may additionally include return control means 47. The HDD portable player 10 exemplifies the server device for media 40. The internal storage device 51 of the server device for media 40 is not limited to the HDD, but can be other devices such as a mass storage flash memory. The network player 27 exemplifies the network player 56. The network 26 exemplifies the network 55. The network HDD 35 exemplifies the network storage device 57.

The transfer control means 41 transfers part of held digital contents in the internal storage device to the network storage device 57, which is connected to the network 55 and is capable of storing data, and stores the contents there. The list information presentation means 42 responds to the list presentation request for the held digital contents of the server device for media 40 issued from the network player 56 by transmitting the list information, which makes the digital contents left in the internal storage device 51 and the digital contents transferred from the internal storage device 51 to the network storage device 57 and stored in the network storage device 57 as the held digital contents of the internal storage device 51, to the network player 56.

The search means 43 responds to the data transmission request for the held digital contents issued from the network player 56 by searching for the location where the held digital contents are currently stored. If the result of search shows the network storage device 57, the contents data transmission processing means 44 makes the corresponding data stream-delivered from the network storage device 57 to the network player 56.

A digital content refers to, for example, a music piece or a picture (moving picture or still image). The connection of the server device for media 40 and the network player 56 to the network 55 can be made by cable or made wirelessly. The network 55 is built in the home 21 or the automobile 22, for example (FIG. 2). Therefore, the network storage device 57 is not limited to be placed in the home 21, but can be placed in the automobile 22.

The transfer control means 41 selects the digital contents from the held digital contents in the internal storage device 51 to transfer to the network storage device 57 according to any criteria. For example, in the present case, the transfer control means 41 can select, as the contents to be transferred, (a1) a digital content which the user of the server device for media 40 and/or the network player 56 has not been played in a predetermined period past from the present; (a2) a digital content which has not been subjected to the self-playback in the server device for media 40 and only has been subjected to the network-playback in the network storage device 57; (a3)

all the digital contents to a predetermined order in the ascending order of the playback frequency; or (a4) a digital content over a predetermined size.

The transfer control means 41 transfers part of the held digital contents from the internal storage device 51 to the network storage device 57 for any reason. For example, the reason may be (b1) the user needs a predetermined free capacity for storing a new digital content since the internal storage device 51 is nearly filled with the digital contents stored up to the present time; or (b2) the user wants to transfer the held digital contents to the network storage device 57 instead of deleting them in the case of using the contents in the future.

Since the server device for media 40 can maintain the user operation in the case where all the digital contents are stored in the internal storage device 51 for the request for the list information or the data transmission request when the held digital contents of the server device for media 40 is to be subjected to the network-playback even though the server device for media 40 has transferred part of the held digital contents from the internal storage device 51 to the network storage device 57, the server device for media 40 provides good operability for the network-playback in the network player 56.

The digital contents which have been transferred to the network storage device 57 are transmitted from the network storage device 57 to the network player 56 directly and indirectly.

For indirect transmission, the contents data transmission processing means 44 causes the network storage device 57 to transmit the corresponding data to the server device for media 40, and then, to transmit the corresponding data received from the network storage device 57 from the server device for media 40 to the network player 56.

In the specific example of indirect transmission to the network player 56, the server device for media 40 receives a stream-delivery request from the network player 56, obtains the data of the corresponding digital contents (which is referred to as "items" in the DLNA) from the network storage device 57, and sends out the data to the network player 56, and the contents data transmission processing means 44 does not transfer the stream-delivery request from the network player 56 to the network storage device 57. The contents data transmission processing means 44 needs not to copy the data to the internal storage device 51 to implement the above-described operations alone. The contents data transmission processing means 44 can implement the operations only by obtaining the data from the network storage device 57 to a buffer memory in the server device for media 40 step by step and sending the data out to the network player 56.

For direct transmission, the contents data transmission processing means 44 transmits the corresponding data and information for identifying the network storage device 57 to the network player 56, and causes the network storage device 57 to directly transmit the corresponding data to the network player 56.

In the specific example of direct transmission to the network player 56, if the network storage device 57 has an HTTP server function, a URI of the corresponding data in the network storage device 57 is written in the metadata relating to the digital contents that is to be transmitted from the server device for media 40 to the network player 56 as a value of "address (URI) to be accessed when the data of the actual contents is obtained by HTTP-GET" so that the network player 56 can obtain the data from the network storage device 57 (by HTTP-GET).

The server device for media 40 may additionally include return control means 47. The return control means 47 causes the network storage device 57 to return the digital contents corresponding to a predetermined condition among the digital contents, which have been transferred to the network storage device 57, to the server device for media 40.

The predetermined condition may be, for example, the digital contents which have recently been subjected to the self-playback among the digital contents which have been transferred to the network storage device 57, or the digital contents which have recently been played whether by self-playback or the network-playback. The "self-playback" here includes not only the case in which the server device for media 40 plays the digital contents left in the internal storage device 51 as a single item but also the case in which the server device for media 40 plays the digital contents which have been transferred from the internal storage device 51 to the network storage device 57 and stored there as a single item. For example, if the digital contents which have been transferred from the internal storage device 51 to the network storage device 57 and stored there are called at least once for the self-playback or the network-playback after the transfer, the process for returning (putting back) the digital contents from the network storage device 57 to the internal storage device 51 can be taken.

Preferably, the list information presentation means 42 transmits the list information to the network player 56, including information for identifying whether each digital content is currently stored in the internal storage device 51 or the network storage device 57 in the display list of the network player 56.

The network player 56 receives the information for identifying whether each digital content is currently stored in the internal storage device 51 or the network storage device 57 from the server device for media 40. In the display list for the user, for example, the network player 56 shows names of the digital contents stored in the internal storage device and names of the digital contents stored in the network storage device 57 in different colors, or shows the names of the digital contents stored in the network storage device 57 in lighter color than that of the names of the digital contents stored in the internal storage device 51.

Even if the server device for media 40 and the network player 56 are normally connected to the network 55, the server device for media 40 may be unable to respond to the data transmission request from the network player 56 for the digital contents which have been transferred to the network storage device 57 by actually transmitting the data to the network player 56 for such a reason as the network storage device 57 being switched off. To deal with such a problem, the server device for media 40 is equipped with connection detecting means (not shown) for checking whether the network storage device 57 is connected to the network 55 or not. If the network storage device 57 is not connected to the network 55, the list information presentation means 42 can make the list information for the network player 56 include predetermined information for allowing the network player 56 to perform a process for expressing the non-connection on its display list. In that case, the user views the list of the digital contents on the display unit of the network player 56 and can identify whether the digital contents stored in the network storage device 57 (c1) can be actually played in response to an instruction to play issued from the network player 56, or (c2) cannot be played in response to the instruction to play issued from the network player 56.

It is also possible to exclude the digital contents relating to (c2) from the list information to be transmitted from the server device for media 40 to the network player 56 so that the digital contents are not shown on the display list of the network player 56.

Described below is a specific example of list information structure that is transmitted from the server device for media 40 to the network player 56 for allowing the user of the network player 56 to identify the digital contents held in the internal storage device 51 (hereinafter, referred to as "real held contents" for convenience) and the digital contents held in the network storage device 57 (hereinafter, referred to as "virtual held contents"). Neither UPnP nor DLNA has a specification in which a proper flag or the like that can be used to distinguish the virtual held contents from the real held contents is defined. Since the GUI for the DMP is generated by the DMP and the DMP manufacturer designs the GUI at discretion, the DMS cannot change the displayed color or the like of the GUI. Therefore, "*", for example, is added to the title of the digital contents or an extension tag, for example, <kenwood:BackUp> is defined in the XML of the digital contents so that the DMP that can recognize the tag determines whether the digital contents are the virtual held contents or the real held contents according to the value (for example, 1 and 0) and displays them in different colors or the like in the GUI.

For the purpose of copyright protection, some digital contents are adapted not to permit the overlapped part of the same content exists in a plurality of storage devices for more than several seconds in the playback time, for example. If the transferring operation of such a digital content from the internal storage device 51 to the network storage device 57 is interrupted by a failure in the network 55 or the like, the original digital content cannot be recovered neither in the internal storage device 51 nor the network storage device 57, which causes a great damage to the user.

As a countermeasure to deal with the problem, the transfer control means 41 preferably does not transfer, from the internal storage device 51 to the network storage device 57, the digital contents that cannot be recovered if the network failure occurs during the transferring of the digital contents from the internal storage device 51 to the network storage device 57.

Alternatively, the transfer control means 41 transfers the digital contents that cannot be recovered if the network failure occurs during the transferring of the digital contents from the internal storage device 51 to the network storage device 57 after obtaining permission from the user.

FIG. 6 is a flowchart of the method for controlling a server for media 65. The method for controlling a server for media 65 corresponds to the server device for media 40 (FIG. 5). The specific example described for the server device for media 40 can also be applied to that for the method for controlling a server for media 65. The server device for media 40 to which the method for controlling a server for media 65 is applied is equipped with the internal storage device 51 for storing the digital contents, and responds to the data transmission request from the network player 56 by stream-delivering the corresponding data of the corresponding digital contents from the internal storage device 51 to the network player 56 during connection to the network.

The method for controlling a server for media 65 includes a transfer processing routine, a list information transmitting routine, and a digital contents data transmitting routine. The transfer processing routine is executed in response to, for example, a user's instruction. The list information transmitting routine is executed when the server device for media 40 receives a list information transmission request from the network player 56. The digital contents data transmitting routine is executed when the server device for media 40 receives the data transmission request from the network player 56.

In the transfer processing routine of the method for controlling a server for media 65, in S68, part of the held digital contents in the internal storage device 51 is transferred to and stored in the network storage device 57 which is connected to the network 55 and is capable of storing data.

In the list information transmitting routine of the method for controlling a server for media 65, in S71, the list information that makes the digital contents left in the internal storage device 51 and the digital contents that have been transferred from the internal storage device 51 to the network storage device 57 and stored in the network storage device 57 as the held digital contents of the internal storage device to the network player 56.

In the digital contents data transmitting routine of the method for controlling a server for media 65, in S74, a location where the digital contents relating to the data transmission request for the held digital contents from the network player 56 is currently stored is searched for. If the result of search in S74 shows the network storage device 51, the method is adapted to stream-delivered the corresponding data from the network storage device 57 to the network player 56. In S76, the corresponding data is transmitted from the network storage device 57 to the network player 56.

S76 in the digital contents data transmitting routine shown in FIG. 6 shows an example of indirect transmission to the network player 56. In the direct transmission, since the method transmits the corresponding data and information for identifying the network storage device 57 to the network player 56 and causes the network storage device 57 to directly transmit the corresponding data to the network player as described above, the direct transmission processing is completed in S71 of the list information transmitting routine, thus, S76 is omitted.

In the first specific example in S76, the method causes the network storage device 57 to transmit the corresponding data to the server device for media 40, and then causes the server device for media 40 to transmit the corresponding data received from the network storage device 57 to the network player 56.

In the second specific example in S76, the method transmits the corresponding data and information for identifying the network storage device to the network player 56, and causes the network storage device 57 to directly transmit the corresponding data to the network player 56.

The method for controlling a server for media 65 may have a returning routine added. In the step of the returning routine, the method causes the network storage device 57 to return the digital contents corresponding to a predetermined condition among the digital contents which have been transferred to the network storage device 57 to the internal storage device 51.

Preferably, in S71, the method transmits the list information to the network player 56, including information for identifying whether each digital content is currently stored in the internal storage device 51 or the network storage device 57 in the display list of the network player 56.

Preferably, in S68, the method does not transfer the digital contents that cannot be recovered if the network failure occurs during the transferring of the digital contents from the internal storage device 51 to the network storage device 57 from the internal storage device 51 to the network storage device 57.

Also in S68, the method may transfer the digital contents that cannot be recovered if the network failure occurs during the transferring of the digital contents from the internal storage device 51 to the network storage device 57 after obtaining permission from the user.

The technical thought of the server device for media 40 can be implemented as a program. That is, the program causes a computer to function as each means in the server device for media 40. The technical thought of the method for controlling a server for media 65 can also be implemented as a program. That is, the program causes a computer to execute each step of the method for controlling a server for media 65.

Although the present invention has been described with reference to the best modes, it is needless to say that the present invention is not limited to them and can be implemented by various modes within the spirit of the invention.

The invention claimed is:

1. A server device for media, the server device for media comprising:
   an internal storage device for storing digital contents, wherein the server device for media responds to a data transmission request from a network player by stream-delivering corresponding data in corresponding digital contents from the internal storage device to the network player during connection to a network;
   a transfer control unit adapted to transfer and store part of held digital contents in the internal storage device to a network storage device, wherein the network storage device is connected to the network and is capable of storing data, and wherein said transfer control unit does not transfer, from the internal storage device to the network storage device, the digital contents that cannot be recovered if a network failure occurs during the transferring of the digital contents from the internal storage device to the network storage device;
   a list information transmission unit adapted to respond to a list presentation request for the held digital contents of the server device for media from the network player by transmitting list information to the network player, wherein the list information lists the digital contents left in the internal storage device and the digital contents transferred from the internal storage device to the network storage device and stored in the network storage device, and wherein the list information maintains a tree structure of the digital contents in the internal storage device before transferring the digital contents to the network storage device;
   a search unit adapted to respond to a data transmission request for the held digital contents from the network player by searching for a location where the held digital contents are currently stored; and
   a digital contents data transmission processing unit adapted to allow the corresponding data in held digital contents to be stream-delivered from the network storage device to the network player, if the result of search shows the network storage device,
   wherein the server device for media is a media player.

2. The server device for media according to claim 1, wherein said digital contents data transmission processing unit causes the network storage device to transmit the corresponding data to the server device for media, and then transmits the corresponding data received from the network storage device from the server device for media to the network player.

3. The server device for media according to claim 1, wherein said digital contents data transmission processing unit transmits the corresponding data and information for identifying the network storage device to the network player, and causes the network storage device to directly transmit the corresponding data to the network player.

4. The server device for media according to claim 1, further comprising
   a return control unit adapted to cause the digital contents corresponding to a predetermined condition among the digital contents which have been transferred to the network storage device to be returned from the network storage device to the internal storage device.

5. The server device for media according to claim 1, wherein
   said list information transmission unit makes the list information to be transmitted to the network player include information for identifying whether each digital content is currently stored in the internal storage device or the network storage device in the display list of the network player.

6. A server device for media, the server device for media comprising:
   an internal storage device for storing digital contents, wherein the server device for media responds to a data transmission request from a network player by stream-delivering corresponding data in corresponding digital contents from the internal storage device to the network player during connection to a network;
   a transfer control unit adapted to transfer and store part of held digital contents in the internal storage device to a network storage device, wherein the network storage device is connected to the network and is capable of storing data, and wherein the digital contents that cannot be recovered if a network failure occurs during the transferring of the digital contents from the internal storage device to the network storage device is transferred after obtaining permission from a user;
   a list information transmission unit adapted to respond to a list presentation request for the held digital contents of the server device for media from the network player by transmitting list information to the network player, wherein the list information lists the digital contents left in the internal storage device and the digital contents transferred from the internal storage device to the network storage device and stored in the network storage device, and wherein the list information maintains a tree structure of the digital contents in the internal storage device before transferring the digital contents to the network storage device;
   a search unit adapted to respond to a data transmission request for the held digital contents from the network player by searching for a location where the held digital contents are currently stored; and
   a digital contents data transmission processing unit adapted to allow the corresponding data in held digital contents to be stream-delivered from the network storage device to the network player, if the result of search shows the network storage device,
   wherein the server device for media is a media player.

7. A method for controlling a server device for media which is equipped with an internal storage device for storing digital contents, the method comprising the steps of:
   responding to a data transmission request from a network player by stream-delivering corresponding data in corresponding digital contents from the internal storage device to the network player during connection to a network;
   transferring and storing part of held digital contents in the internal storage device to a network storage device, wherein the network storage device is connected to the network and is capable of storing data, and wherein the digital contents that cannot be recovered if a network failure occurs during the transferring of the digital contents are not transferred from the internal storage device to the network storage device;

responding to a list presentation request for the held digital contents of the server device for media from the network player by transmitting list information to the network player, wherein the list information lists the digital contents left in the internal storage device and the digital contents transferred from the internal storage device to the network storage device and stored in the network storage device, and wherein the list information maintains a tree structure of the digital contents in the internal storage device before transferring the digital contents to the network storage device;

responding to a data transmission request for the held digital contents from the network player by searching for a location where the held digital contents are currently stored; and allowing the corresponding data in held digital contents to be stream-delivered from the network storage device to the network player, if the result of search shows the network storage device, wherein the service device for media is a media player.

8. The server device for media according to claim 6, wherein said digital contents data transmission processing unit causes the network storage device to transmit the corresponding data to the server device for media, and then transmits the corresponding data received from the network storage device from the server device for media to the network player.

9. The server device for media according to claim 6, wherein said digital contents data transmission processing unit transmits the corresponding data and information for identifying the network storage device to the network player, and causes the network storage device to directly transmit the corresponding data to the network player.

10. The server device for media according to claim 6, further comprising
a return control unit adapted to cause the digital contents corresponding to a predetermined condition among the digital contents which have been transferred to the network storage device to be returned from the network storage device to the internal storage device.

11. The server device for media according to claim 6, wherein
said list information transmission unit makes the list information to be transmitted to the network player include information for identifying whether each digital content is currently stored in the internal storage device or the network storage device in the display list of the network player.

12. A method for controlling a server device for media which is equipped with an internal storage device for storing digital contents, the method comprising the steps of:

responding to a data transmission request from a network player by stream-delivering corresponding data in corresponding digital contents from the internal storage device to the network player during connection to a network;

transferring and storing part of held digital contents in the internal storage device to a network storage device, wherein the network storage device is connected to the network and is capable of storing data, and wherein the digital contents that cannot be recovered if a network failure occurs during the transferring of the digital contents from the internal storage device to the network storage device is transferred after obtaining permission from a user;

responding to a list presentation request for the held digital contents of the server device for media from the network player by transmitting list information to the network player, wherein the list information lists the digital contents left in the internal storage device and the digital contents transferred from the internal storage device to the network storage device and stored in the network storage device, and wherein the list information maintains a tree structure of the digital contents in the internal storage device before transferring the digital contents to the network storage device;

responding to a data transmission request for the held digital contents from the network player by searching for a location where the held digital contents are currently stored; and allowing the corresponding data in held digital contents to be stream-delivered from the network storage device to the network player, if the result of search shows the network storage device, wherein the server device for media is a media player.

* * * * *